Patented Dec. 18, 1928.

1,695,637

UNITED STATES PATENT OFFICE.

CARLETON ELLIS, OF MONTCLAIR, NEW JERSEY, ASSIGNOR TO CHADELOID CHEMICAL COMPANY, A CORPORATION OF WEST VIRGINIA.

CEMENT.

No Drawing.  Application filed March 22, 1924. Serial No. 701,020.

This invention relates to an adhesive or cement, which is unaffected by the action of water, acid fumes and the like, and to bodies joined thereby. This application is in major part a continuation of application Serial No. 480,565, filed June 27, 1921 now Patent 1,544,529, June 30, 1925, and involves the use of chlorinated rubber as a base or constituent of adhesive compositions. The chlorination of the rubber may be performed as stated in the prior case above referred to, or other cases (now Patents 1,544,529 to 1,544,535 all issued June 30, 1925) as well as by other processes. These processes generally include treatment of rubber (I prefer to employ unvulcanized rubber), with chlorine, preferably under pressure, the chlorine preferably being in excess, and the chlorination being effected at a temperature preferably below that at which any considerable amount of decomposition of rubber or chlorinated rubber would be effected. Solvents say $CCl_4$ or $C_6H_6$ may be present during such chlorination (e. g. in a small amount, sufficient to soften the mass and to dissolve the chlorinated rubber as formed) or not, as desired. The chlorinated rubber may also be prepared by other methods.

Raw or crude rubber when treated with a solvent such as benzol or carbon bisulfide, swells greatly and eventually forms a very viscous solution containing a very large proportion of solvent (and of course a very small proportion of rubber). This solvent does not evaporate readily when exposed to the air, causing the material to remain soft and tacky for long periods. If used as an adhesive, e. g. as a cement for belt laps, etc., it is difficult to introduce sufficient of the material owing to the great bulk of solvent, and no very great strength is developed because of the soft nature of the cementing film.

Chlorinated rubber such as is made by treating raw rubber with chlorine, is, on the other hand, much more soluble in rubber solvents (e. g. $CS_2$, $CCl_4$, $C_2H_2Cl_4$, $C_6H_6$, etc.) than the original rubber from which it was formed, especially in the case of the more highly chlorinated varieties. Solutions of chlorinated rubber, in say $CCl_4$, containing 20% to 40% of the solid substance (chlorinated rubber) are not too viscous for the purposes of the present invention. Solutions of the chlorinated rubber in the solvents of course can readily be prepared by dissolving the chlorinated rubber in the solvents. Thus 20 lbs. of chlorinated rubber containing 67% of combined chlorine can be dissolved in 80 lbs. of $CCl_4$ to produce a 20% solution of such chlorinated rubber. Or 40 lbs. of chlorinated rubber of the same (or other) chlorine content, dissolved in 60 lbs. of, say, benzol, will give a 40% solution of the chlorinated rubber. Such solutions can be put up into suitable receptacles, as cans, bottles, tubes, etc., in the manner that glue, rubber cement etc., are put up. The packages of the product can be labeled and the adhesive can be employed in the usual manner of applying adhesives.

There is not claimed herein to be anything novel in the particular mode of preparing the cement or adhesive, nor in the particular mode of applying the adhesive to the pieces to be joined. The feature of this disclosure which is regarded as the basis or kernel of the invention is my discovery of the possibility of using chlorinated rubber as the basis of adhesive compositions or cements, which I claim to be new and a valuable addition to the art of adhesives. The use of solutions of such concentrations (20 to 40% of chlorinated rubber) obviates in many cases the necessity of first sizing with the solution the surfaces to be cemented together, one coating being often sufficient to furnish all the adhesive necessary to form a strong bond. Solvents evaporate readily from thin layers of chlorinated rubber solutions, leaving a firm, tough, adhering film, requiring a minimum amount of time to set.

Solutions of chlorinated rubber containing very high percentages of the solid (i. e. chlorinated rubber) say 30% to 40% or more, are well adapted for use as cements, and for this purpose may be troweled on, or poured on and spread with a paddle, etc. While the use of chlorinated raw, or crude, rubber, is greatly preferred in carrying out this invention, the employment of chlorinated vulcanized rubber or of chlorinated reclaimed rubber is not precluded.

In preparing chlorinated rubber solutions for use as cements it is preferable to use highly volatile solvents in order to bring about rapid evaporation and consequent quick setting of the cement. Such solvents as carbon bisulfide, and benzol are desirable, although in some cases less volatile solvents such as toluol, xylôl, or solvent naphtha may be utilized.

The more highly chlorinated grades of chlorinated rubber containing 67% or more of combined chlorine possess the greatest solubility and are therefore desirable in some cases. In other instances the lower chlorinated varieties may be preferred on account of their greater toughness and flexibility. All grades are unaffected by water and by various corrosive agencies such as acid fumes, thus fitting them for use in cementing belts required to run under water and other joints where strength, flexiblity and water resistance are desirable.

The flexibility of the cement may be increased by the addition of softeners. These substances, among which are camphor, triphenyl and tricresyl phosphates, diethyl phthalate, pentachlorethane and other solid solvents of chlorinated rubber, and semi-drying oils such as corn oil and peanut oil, may be present in various proportions, according to the degree of flexibility required. Preferably they are employed in amounts materially less than that of the chlorinated rubber.

Antacid material such as urea, aniline, toluidine, diphenylamine, phenylene diamine, etc., may be added to the solution in some instances. These are added to overcome and neutralize acidity that might develop after standing for a long time.

When a cement such as described is used in the more concentrated forms, so as to approach a putty-like consistency, a certain amount of shrinkage may become apparent, which is undesirable for some purposes, as in cementing pipes, etc. This contraction or shrinkage may be largely eliminated by means of incorporating finely ground bodying or extending agents. Examples of such materials are whiting, zinc oxide, barytes, litharge, silex, asbestos, talc, or if heat resistance is unnecessary, cotton, wool, wood flour, sawdust, and like materials. These are mixed with the chlorinated rubber solution so as to form a dough- or putty-like mass. Preferably they are used in a proportion larger than that of the chlorinated rubber, and may be present to as great an extent as 70% or more of the solvent free mixture.

In the foregoing and in the appended claims, "chlorinated" rubber is referred to but it is to be understood that the use along with chlorine of bromine or other halogens in making a chlorinated product also having other halogens in combination is not precluded since included within the purview of this invention are chlorinated rubber products or chlorinated rubber derivatives which may contain other elements than simply chlorine, carbon and hydrogen in so far as such products function in a manner similar or analogous to true chlorinated rubber. Likewise in place of natural rubber artificial rubber may be employed in some cases as a basis for halogenation; or gutta percha, balata etc., may be utilized.

Bodies or articles whose surfaces are joined by a cement comprising chlorinated rubber may include leather, parts of shoes, furniture, wooden parts, press board, laminated material etc.

What I claim is:—

1. In the process of joining bodies the step which comprises applying between said bodies, a layer of an adhesive composition comprising as its essential constituent, a chlorinated rubber containing not substantially below 67% of chlorin, dissolved in a volatile solvent.

2. In the art of joining a plurality of bodies by adhesive compositions, the hereindescribed improvement which comprises the step of applying to the surface of contact of said bodies, an adhesive composition comprising chlorinated rubber and a solvent therefor.

3. An adhesive composition comprising a solution of chlorinated rubber in a solvent for chlorinated rubber, in such proportions as to form an adhesive composition.

4. An adhesive composition comprising a solution of a chlorinated rubber the latter containing not substantially below 67% of combined chlorin, and a solvent therefor, the chlorinated rubber being present in amount not substantially below 20%.

5. An adhesive composition comprising a solution of a chlorinated-rubber containing substantially over 67% of chlorin, and a solvent therefor.

CARLETON ELLIS.